(12) United States Patent
Li et al.

(10) Patent No.: US 11,030,308 B2
(45) Date of Patent: Jun. 8, 2021

(54) INTER-APPLICATION DEPENDENCY ANALYSIS FOR IMPROVING COMPUTER SYSTEM THREAT DETECTION

(71) Applicant: NEC Laboratories America, Inc., Princeton, NJ (US)

(72) Inventors: Ding Li, West Windsor, NJ (US); Kangkook Jee, Princeton, NJ (US); Zhengzhang Chen, Princeton Junction, NJ (US); LuAn Tang, Pennington, NJ (US); Zhichun Li, Princeton, NJ (US)

(73) Assignee: NEC Corporation

( * ) Notice: Subject to any disclaimer, the term of this patent is extended or adjusted under 35 U.S.C. 154(b) by 270 days.

(21) Appl. No.: 16/006,164

(22) Filed: Jun. 12, 2018

(65) Prior Publication Data
US 2019/0050561 A1   Feb. 14, 2019

Related U.S. Application Data

(60) Provisional application No. 62/543,032, filed on Aug. 9, 2017, provisional application No. 62/591,819, filed on Nov. 29, 2017.

(51) Int. Cl.
| | | |
|---|---|---|
| *G06F 21/55* | (2013.01) | |
| *G06F 9/48* | (2006.01) | |
| *G06F 16/2455* | (2019.01) | |
| *G06F 16/248* | (2019.01) | |

(52) U.S. Cl.
CPC ......... *G06F 21/552* (2013.01); *G06F 9/4881* (2013.01); *G06F 16/248* (2019.01); *G06F 16/2455* (2019.01); *G06F 2221/034* (2013.01)

(58) Field of Classification Search
CPC .. G06F 21/552; G06F 16/2455; G06F 16/248; G06F 9/4881; G06F 2221/034; G06F 21/55; G06F 17/30; G06F 9/48
See application file for complete search history.

(56) References Cited

U.S. PATENT DOCUMENTS

| | | | |
|---|---|---|---|
| 9,374,359 B2* | 6/2016 | McCann | G06F 16/168 |
| 2012/0110599 A1* | 5/2012 | Schoning | G06F 16/2455 |
| | | | 719/318 |

(Continued)

OTHER PUBLICATIONS

Jiaping Gui et. al., SIG Proceedings NPL Paper, Jul. 1997 (Year: 1997).*

(Continued)

*Primary Examiner* — Quazi Farooqui
(74) *Attorney, Agent, or Firm* — Joseph Kolodka

(57) ABSTRACT

A method and system are provided for improving threat detection in a computer system by performing an inter-application dependency analysis on events of the computer system. The method includes receiving, by a processor operatively coupled to a memory, a Tracking Description Language (TDL) query including general constraints, a tracking declaration and an output specification, parsing, by the processor, the TDL query using a language parser, executing, by the processor, a tracking analysis based on the parsed TDL query, generating, by the processor, a tracking graph by cleaning a result of the tracking analysis, and outputting, by the processor and via an interface, query results based on the tracking graph.

14 Claims, 6 Drawing Sheets

(56) References Cited

U.S. PATENT DOCUMENTS

2016/0299982 A1* 10/2016 Bhave ................... G06F 16/31
2016/0359877 A1* 12/2016 Kulshreshtha .......... G06F 16/17

OTHER PUBLICATIONS

Jiaping Gui et. al., Woodstock'97 Jul. 1, 1997, El Paso, Texas USA. (Year: 1997).*
King, "Backtracking Intrusions", ACM Transactions on Computer Systems, vol. 23, Feb. 2005, pp. 51-76.
Ng, "Enriching Intrusions Alerts Through Multi-Host Causality", NDSS Symposium, Feb. 2005, pp. 1-12.

* cited by examiner

400

```
1 from "01/02/2017" to "02/01/2017"

2 in "desktop1", "destop2"

3 backward file f[path = "C://Sensitive/
        important.doc" and event_time="
        01/16/2017:06:15:14" and type="write" ]
4 -> proc p[exename = "malware1" or exename =
        "malware2" and event_id=12] // added in v2

5 -> ipchannel i[dstip="168.120.11.118"]

6 where time < 10mins and hop < 25

7 and proc.exename != "explorer" //added in v3

8 output = "./result.dot"
```

FIG. 4

INTER-APPLICATION DEPENDENCY ANALYSIS FOR IMPROVING COMPUTER SYSTEM THREAT DETECTION

RELATED APPLICATION INFORMATION

This application claims priority to provisional application Ser. No. 62/543,032 filed on Aug. 9, 2017, and provisional application Ser. No. 62/591,819 filed on Nov. 29, 2017, both incorporated herein by reference herein in their entirety.

BACKGROUND

Technical Field

The present invention relates to data processing, and more particularly to systems and methods for inter-application dependency analysis for improving computer system threat detection.

Description of the Related Art

Increasingly sophisticated attacks, such as Advanced Persistent Threat (APT) attacks, have become a serious challenge for enterprise Information Technology (IT) security due to their stealth and complexity. APT attacks are conducted in multiple stages, including initial comprise, internal reconnaissance, lateral movement, and eventually mission completion. In many cases, an APT attack can gradually compromise an enterprise network by a process that often involves multiple applications and hosts in the enterprise network.

SUMMARY

According to an aspect of the present invention, a system is provided for improving threat detection in a computer system by performing an inter-application dependency analysis on events of the computer system. The system includes a memory device for storing program code. The system also includes a processor, operatively coupled to the memory device. The processor is configured to execute program code stored on the memory device to receive a Tracking Description Language (TDL) query for performing a tracking analysis, the TDL query including general constraints for performing the tracking analysis, a tracking declaration specifying at least events of the computer system to be analyzed, and an output specification specifying a location for storing a tracking graph generated by the tracking analysis; parse the TDL query using a language parser; execute the tracking analysis based on the parsed TDL query by implementing a progressive tracking method to generate a result of the tracking analysis; generate a tracking graph by cleaning the result of the tracking analysis by removing all nodes that fail to meet constraints of the TDL query; and output, via an interface, query results based on the tracking graph, the query results including at least one of the tracking graph and an optimized version of the tracking graph.

According to another aspect of the present invention, a computer-implemented method is provided for improving threat detection in a computer system by performing an inter-application dependency analysis on events of the computer system. The method includes receiving, by a processor operatively coupled to a memory, a Tracking Description Language (TDL) query for performing a tracking analysis, the TDL query including general constraints for performing the tracking analysis, a tracking declaration specifying at least events of the computer system to be analyzed, and an output specification specifying a location for storing a tracking graph generated by the tracking analysis; parsing, by the processor, the TDL query using a language parser; executing, by the processor, the tracking analysis based on the parsed TDL query, including implementing a progressive tracking method to generate a result of the tracking analysis; generating, by the processor, a tracking graph by cleaning the result of the tracking analysis, including removing all nodes that fail to meet constraints of the TDL query; and outputting, by the processor and via an interface, query results based on the tracking graph, the query results including at least one of the tracking graph and an optimized version of the tracking graph.

According to yet another aspect of the present invention, a computer program product is provided. The computer program product includes a non-transitory computer readable storage medium having program instructions embodied therewith. The program instructions are executable by a computer to cause the computer to perform a method for improving threat detection in a computer system by performing an inter-application dependency analysis on events of the computer system. The method includes receiving a Tracking Description Language (TDL) query for performing a tracking analysis, the TDL query including general constraints for performing the tracking analysis, a tracking declaration specifying at least events of the computer system to be analyzed, and an output specification specifying a location for storing a tracking graph generated by the tracking analysis; parsing the TDL query using a language parser; executing the tracking analysis based on the parsed TDL query, including implementing a progressive tracking method to generate a result of the tracking analysis; generating a tracking graph by cleaning the result of the tracking analysis, including removing all nodes that fail to meet constraints of the TDL query; and outputting, via an interface, query results based on the tracking graph, the query results including at least one of the tracking graph and an optimized version of the tracking graph.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 4 is a diagram showing an exemplary TDL query, in accordance with an embodiment of the present invention;

DETAILED DESCRIPTION OF PREFERRED EMBODIMENTS

Figure 1:
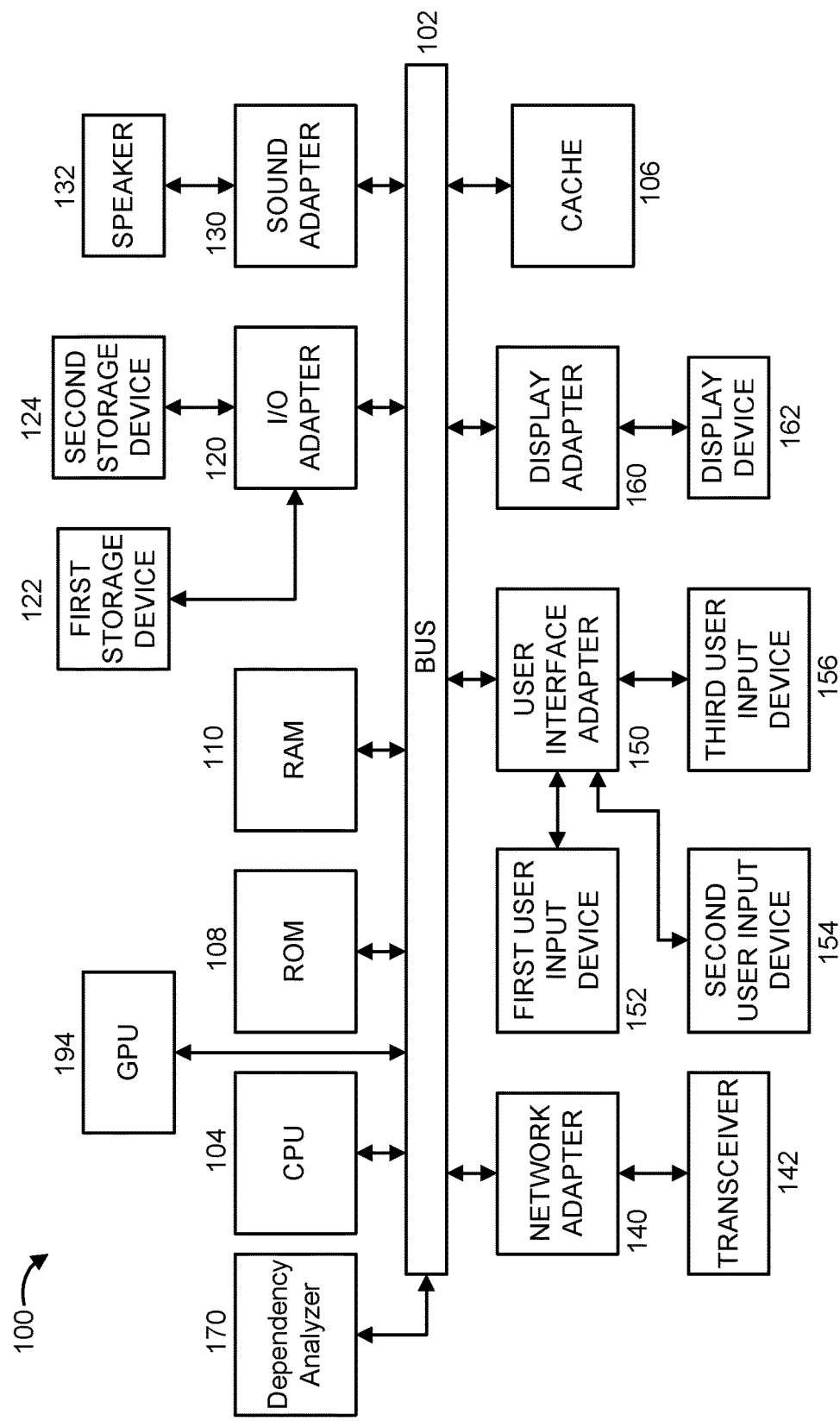
FIG. 1 is a block diagram showing an exemplary processing system 100 to which the present invention may be applied, in accordance with an embodiment of the present invention.

Tracking analysis in accordance with the embodiments described herein can be used to detect and defend against sophisticated system level security threats that involve multiple processes or applications (e.g., APT attacks) by monitoring and tracking system events (e.g., system activity logs recording system activities) associated with data flows between different applications and hosts (e.g., cross-application data flow or information flow). System events are interactions between system objects (e.g., processes, files and network communication instances). A system event can include four attributes: (1) the subject (e.g., the process instance that initiates the interaction); (2) the system object that the subject interacts with; (3) the direction of the data flow (from the subject to the system object or vice versa); and (4) the timestamp of the interaction.

One technique that can be used to connect multiple security alerts and reconstruct attack scenarios in accordance with the embodiments described herein is backtracking. Backtracking techniques can track backward event dependencies between system events. An event A is said to backward depend on another event B if (1) B happens before A and the destination of the data flow of B is the source of the data flow of A. Backtracking techniques can generate a tracking graph that connects the system events based on their dependencies. For example, system events can be organized as a directed graph, where the nodes of the graph are system objects and the edges are the system events with their start timestamps, and the tracking analysis can recover the data flows by searching the directed graph. When an abnormality is detected, tracking analysis can be used to recover the root cause of the abnormality and determine whether there is a threat.

Various problems associated with performing tracking analysis to detect threats can arise, thereby constraining the usability of tracking analysis to detect threats in, e.g., an enterprise environment. For example, detecting a threat like an APT attack can involve several iterations of tracking analysis. If each iteration takes hours (or days) to run, the threat may be detected after it has already caused substantial damage to the enterprise environment. Accordingly, tracking analysis speed can be prohibitively long for complex attacks (e.g., hours or days). As another example, the results of tracking analysis can include hundreds of thousands of items, with many of the items being unrelated to security threats. Thus, tracking analysis techniques can produce tracking graphs that include a lot of noise, which can prevent effective interpretation of the results of the tracking analysis for discovering system attacks. Accordingly, the results of tracking analysis can be difficult to interpret since the data flow of a system attack can be very complex.

The above-noted problems associated with tracking analysis to detect system attacks (e.g., tracking analysis speed and results interpretation difficulty) are caused by the complexity of modern operating systems and enterprise environments. For example, in an enterprise environment, the data flow associated with an attack can involve many applications and hosts. Furthermore, modern operating systems can generate a lot of noise data flow across applications, and attack footprints can be hidden behind a large volume of system noise. For example, when a user opens a folder, a data flow path can be created from each file in the folder (e.g., if a folder contains ten thousand files, then ten thousand data flow paths will be created). Such data flow paths can also be tracked during the tracking analysis, which can result in a very slow process and that generates uninterpretable results. Further, these data flow paths are noise in the context of detecting and defending against attacks, since they are unrelated to security threats.

Removing system noise can significantly reduce tracking analysis time and generate much more interpretable results. However, the use of strictly automated techniques for removing (e.g., filtering) system noise suffer from disadvantages. For example, attackers can design new attacks that take advantage of such strictly automated techniques. Additionally, tracking analysis techniques can lack semantic-level information regarding system activities, which cannot be effectively integrated into the tracking analysis automatically. For example, in many cases, tracking may reach the library files (e.g., .dll files). These files are often shared by multiple applications and thus can possibly introduce data flows that are not related to the attack. However, an automated technique cannot directly remove all .dll files from the tracking analysis because they may be compromised. Before removing the .dll files, the tracking analysis has to ensure that there are no suspicious modification to the .dll files, which still utilizes manual inspection techniques.

To address at least the above-noted concerns and problems associated with tracking analysis techniques (e.g., backtracking) to detect attacks (e.g., APTs) on a computer system (e.g., an enterprise environment), aspects of the present invention provide for cross-application data flow querying systems and methods for improving attack detection. For example, the embodiments described herein can effectively incorporate knowledge (e.g., security expert knowledge) to improve the ability to distinguish malicious behaviors (e.g., APT threats) from benign behaviors (e.g., normal enterprise environment operations).

The embodiments described herein provide for a way to customize the tracking analysis, as well as a way to make the tracking analysis "tunable." That is, using tracking analysis techniques to reconstruct attack scenarios in accordance with the embodiments described herein can be viewed as a "debugging" process, such that the tracking analysis process can be monitored progressively, intermediate results of data flows can be inspected, and process interaction can be integrated to provide guidance to the tracking analysis. Accordingly, the embodiments described herein allows for security experts to interactively and progressively debug the tracking analysis.

To provide an interface for customizing the tracking analysis, the embodiments described herein utilize a Domain Specific Language (DSL), referred to herein as a Tracking Description Language (TDL). TDL can be used by security experts to provide their domain knowledge (e.g., excluding unrelated data flows or specifying part of the attack paths) to customize the tracking analysis. These specifications can be automatically incorporated into the tracking analysis to, e.g., prune system noises. For example, false positives can be pruned from the results of the tracking analysis (e.g., tracking analysis graph).

To further address the above-noted challenges, the embodiments described herein can report the results of the tracking analysis progressively and transform the tracking analysis into an interactive process. For example, execution of the tracking analysis can be paused, the TDL query can be modified to remove noises based on the intermediate results, and execution of the tracking analysis can be resumed based on the modified TDL query.

To ensure the smoothness of the progressive tracking analysis, the embodiments described herein can divide each step in the tracking analysis properly into several portions, ensure that each portion does not require a lot of time to finish, and smoothly update results in real-time or near real-time. By doing so, at least some results can be obtained quickly. Hints can be discovered to accelerate the tracking analysis, allowing tracking specifications to be optimized before the entire tracking analysis process terminates.

The embodiments described herein can accelerate the speed of tracking analysis and increase conciseness of results. For example, the embodiments described herein can provide for an improved parallelization scheme to allow for multi-threaded tracking analysis, thereby increasing the speed of the tracking analysis. Accordingly, more concise and readable results from the tracking analysis can be produced in accordance with the embodiments described herein, thereby reducing costs associated with recovering from attacks.

FIG. 1 is a block diagram showing an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. At least one Graphics Processing Unit (GPU) 194 is operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Dependency analyzer 170 may be operatively coupled to system bus 102. Dependency analyzer 170 is configured to perform one or more of the operations described herein. Dependency analyzer 170 can be implemented as a stand-alone special purpose hardware device, or may be implemented as software stored on a storage device. In the embodiment in which dependency analyzer 170 is software-implemented, although shown as a separate component of the computer system 100, dependency analyzer 170 can be stored on, e.g., the first storage device 122 and/or the second storage device 129. Alternatively, dependency analyzer 170 can be stored on a separate storage device (not shown).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 3:
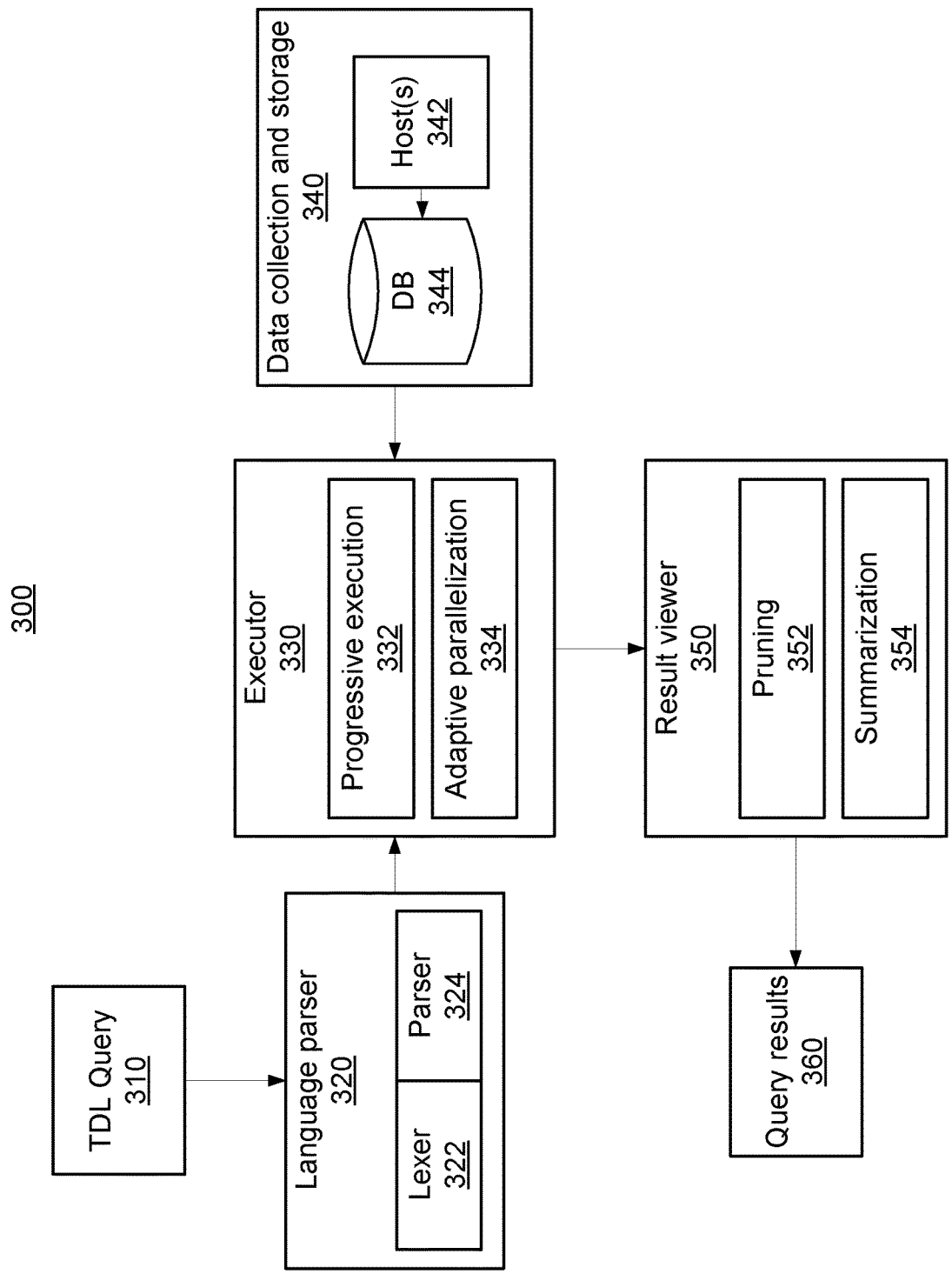
FIG. 3 is a high-level block diagram showing an exemplary system architecture, in accordance with an embodiment of the present invention.

Moreover, it is to be appreciated that architecture 300 described below with respect to FIG. 3 is an architecture for implementing respective embodiments of the present invention. Part or all of processing system 100 may be implemented in one or more of the elements of architecture 300.

Figure 6:
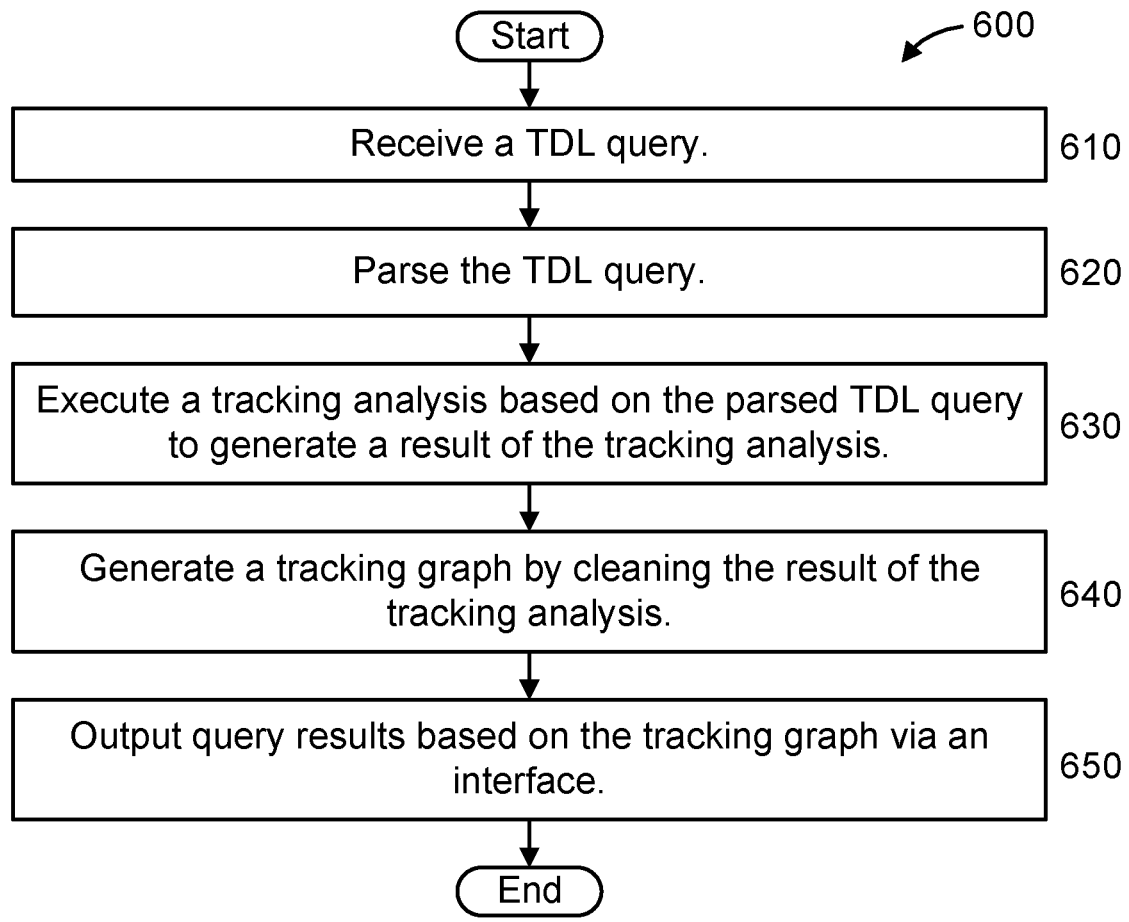
FIG. 6 is a block/flow diagram showing an exemplary system/method for inter-application dependency analysis, in accordance with an embodiment of the present invention.

Further, it is to be appreciated that processing system 100 may perform at least part of the method described herein including, for example, at least part of method 600 of FIG. 6 and method 700 of FIG. 7. Similarly, part or all of architecture 300 may be used to perform at least part of method 600 of FIG. 6 and method 700 of FIG. 7.

A motivating example of a tracking graph will now be described with reference to FIG. 2.

Figure 2:
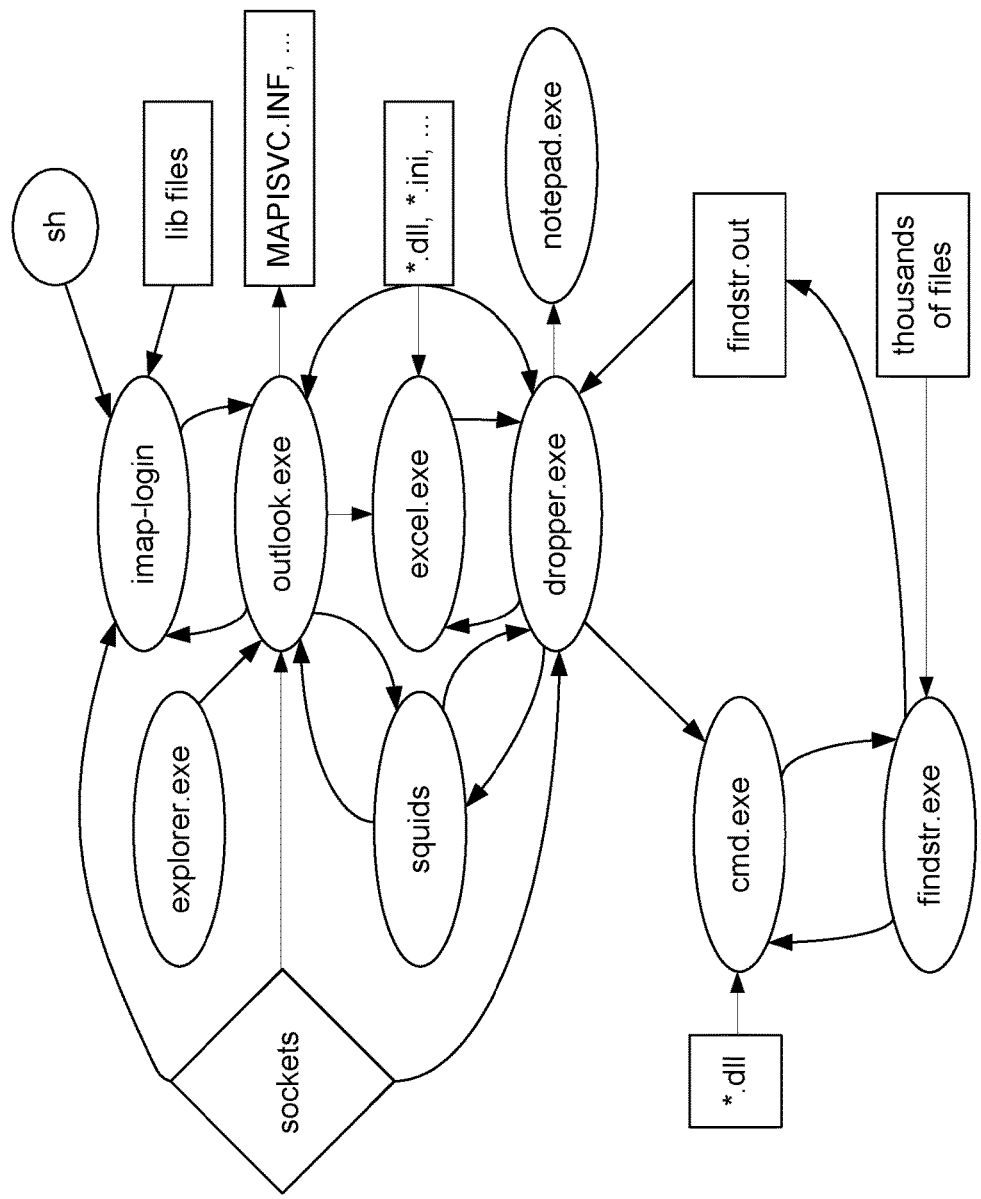
FIG. 2 is a block diagram showing an exemplary dependency graph of an attack case, in accordance with an embodiment of the present invention.

Referring to FIG. 2, an exemplary tracking graph 200 is provided illustrating a phishing e-mail attack. In this attack scenario, the attacker is stealing sensitive credential information from a victim's host by scanning files (e.g., text files) through malware. The attack has several steps. First, the attacker sends an e-mail to the victim, which is shown as including a Microsoft Excel® file attachment ("excel.exe"). The "excel.exe" file can include a malicious macro which can create and execute malware ("dropper.exe"). When the victim opens the "excel.exe" in Microsoft Outlook® ("outlook.exe"), "dropper.exe" uses "cmd.exe" to run "findstr.exe" on the home directory to search important credentials in the victim's machine and dump the credentials as "findstr.out". Then, dropper.exe uploads "findstr.out" to the attacker through the network. Due to the limited space, only important objects in the attack path are shown in the tracking graph of FIG. 2. For example, details for objects such as *.dll, *.ini or the files that were scanned by "findstr.exe" were omitted, and only one node in the tracking graph was used to represent a set of them.

In the attack depicted in FIG. 2, when the "dropper.exe" is executed, an anomaly detector of the system (e.g., enterprise system) can generate an alert due to the execution of an unknown program. Based on this alert, a team of security experts can initiate a backtracking analysis to reconstruct the attack scenario and find the root cause of "dropper.exe". However, the tracking graph of this attack can be very large (e.g., include 30.75K events), and generating a traffic graph of this size can take many hours. Such a large tracking graph and long generation time can prevent the team from effectively discovering the root cause of the attack scenario.

More than 99% of the nodes in the tracking graph of FIG. 2 correspond to irrelevant system noises. One source of the noises are libraries (e.g., .dll files), which are not compromised and have no relationship with the attack in this illustrative example. Another source is that the "findstr.exe"

reads a lot of (text) files created by different applications, and the applications that created the files can lead to thousands of nodes irrelevant to the attack. In this attack "findstr.exe" is a tool used by the malware "dropper.exe" as opposed to the root cause of its. Thus, excluding "findstr.exe" from this attack will not prevent the backtracking analysis from finding the root cause.

It can be very challenging for an automated technique to remove all of the .dll files or the "findstr.exe" in this example. For example, to remove the .dll files, the backtracking analysis needs to first confirm that there are no suspicious modifications to the .dll files and, to remove "findstr.exe", the backtracking analysis needs to know that "findstr.exe" is caused by the malware rather than the root cause. However, it is very difficult to accurately incorporate this information automatically into the backtracking analysis.

In an attack, it can be helpful to perform an interactive and progressive tracking analysis (e.g., backtracking analysis) that permits security experts to "debug" the process. By reading the context of the tracking graph of FIG. 2, the team of security experts can, in accordance with the embodiments described herein, confirm that "findstr.exe" is a consequence and not the cause of "dropper.exe", and can similarly exclude "findstr.exe" from the backtracking analysis. By excluding the .dll files and "findstr.exe" in accordance with the embodiments described herein, the size of the tracking graph of FIG. 2 can be reduced by more than 99.8% and the root cause of "dropper.exe" can be found by the team of security experts on the scale of minutes, rather than hours.

A description will now be given regarding a system architecture to which an interactive and progressive tracking analysis can be applied to improve threat detection in a computer system, in accordance with an embodiment of the present invention.

FIG. 3 is a high-level block diagram showing an exemplary system architecture 300, in accordance with an embodiment of the present invention. The system 300 can be designed to be deployed in a large-scale and homogeneous enterprise IT environment.

As shown, the system 300 can include a language parser 320, an executor 330, data collection and storage having host(s) 342 and a database (DB) 344, and a result viewer 350.

The language parser 320 is configured to receive a tracking descriptive language (TDL) query 310, and parse the TDL query 310. For example, as shown, the language parser 320 can include a lexer component 322 and a parser component 324. The lexer component 322 performs lexical analysis or tokenization, which includes converting a sequence of characters into a sequence of tokens (e.g., strings with an assigned meaning). The parser 324 receives the tokens as input and builds a data structure (e.g., tree) to provide a structural representation of the tokens. Although the language parser 320 is shown including separate lexer and parser components 322 and 324, the functionality of the lexer and parser components 322 and 324 can be embodied as a single component (e.g., scannerless parsing).

As described above, TDL is a domain specific language that can allow users to specify conditions and constraints in the tracking analysis in a concise way. The TDL query 310 can specify constraints including, e.g., time range, host range, start point of backtracking, the end conditions of backtracking, and which path to explore. During the execution of the TDL query 310, a progressively updated backtracking graph can be output.

The TDL query 310 can be viewed as including three parts: (1) general constraints; (2) tracking declaration; and (3) output specification.

The general constraints can include, e.g., time range constraints and host range constraints for the tracking analysis. The time range and the host range are considered general constraints because, in practice, system logs have properties with temporal and special locality. When an alert is received, it can be practical to explore the system logs of all hosts with a long history. However, a more realistic way is to first study the related hosts in a recent time range by providing general constraints that support a concise representation of the time and host range.

The tracking declaration specifies which events should be analyzed and when the tracking analysis should be terminated. The tracking declaration can include a "tracking" statement and a "where" statement.

The tracking statement specifies points including the start point, the end point and any important intermediate points. Intermediate points are supported since, in many cases, the backtracking may need to be specified to search paths that only meet certain patterns. The tracking statement can illustratively be declared as follows:

backward (type var[condition_list] ) (->
type var[condition_list] )+

In this tracking statement, the keyword "backward", which indicates the start of the tracking statement, is followed by a list of nodes. A node is a filter of events, and can be declared as "type var[condition_list]". The phrase "type", which declares the type of a system object, can have values including: "proc" for processes objects, "file for file objects and "ip" for network connection objects. The phrase "var" is a user-defined variable name, and the phrase "condition_list" is a list of constraints that filter the system objects. The constraints can be connected by logical operations. A constraint in the "condition_list" can be a binary operation statement in the form of "field op value", where "field" is an attribute name of the variable. Types of options for the "field" include shared options and object specific options (e.g., "file" options, "proc" options and "ip" options). Shared options, such as "event_id" and "event_time", can be used in all types of system objects (e.g., "proc", "file" and "ip"), which means that the node should only include events with the specified ID and time, respectively. For "file", the possible options include "filename", "host", "path", "last_modification_time", "last_access_time", and "creation_time". For "proc", the possible options include "host", "exename", "pid", and "starttime". For "ip", the possible options include "source_ip", "destination_ip", and "start_time". The operation "op" is a binary operation having possible options including "<", "<=", ">", ">=", "=" and "!=". A "value" after "op" could be a string, numeric value or a time string. If the "value" is a string, then "=" and "!=" can be interpreted as regular expression (regex) match and not match, respectively.

For example, assume that there are k nodes, such that the list of nodes has the format $n_1 \rightarrow n_2 \rightarrow \ldots \rightarrow n_k$. In this list, $n_1$ is the start point, $n_k$ is the end point, and $n_2$ to $n_{k-1}$ are the intermediate points. A symbol, such as "*", can be used as the end point to specify that there are no specific constraints about the end point.

The where statement, which is optional, defines the constraints that are not associated with any specific system objects, such as constraints that exclude events that meet certain conditions or limit the time of backtracking. These constraints can be used to filter system objects during the tracking analysis. Any system object that does not meet the constraint in the where statement will be deleted from the tracking analysis without further exploration. The where statement can be illustratively declared as follows:

where(type.field|hop|time)op value

In this where statement, users can specify a list of constraints in the form of "type.field op value". The constraints are also connected by logic operations. "type", "field", and "op" have the same value set as in the tracking statement. Besides "type.field", the where statement also accepts two special fields: "time" and "hop". These fields can be used to terminate the tracking analysis and can be used with the "<=" operation. The "time" field can be used to limit the time of the tracking analysis, and the "hop" field can be used to limit the maximum length of paths in the tracking analysis. When the tracking analysis finds a path that has the length longer than the threshold specified by the "hop" field, it can stop exploring the path and switches to other shorter paths, if any.

The output specification specifies where the generated tracking graph should be stored.

An exemplary TDL query 400 tracking the path of two malicious applications that steal a sensitive file and send it to the network is illustrated with reference to FIG. 4. As shown, lines 1-2 of the TDL query 400 include general constraints. The time range constraints, as can be seen in line 1 of TDL query 400, can be specified by keywords "from" and "to". The host range constraints, as can be seen in line 2 of the TDL query 400, can be specified by keyword "in". In this illustrative example, the TDL query 400 indicates that the tracking analysis only tracks the system events in the "desktop1" and "desktop2" between the dates of "01/02/2017" and "02/01/2017". It is noted that the general constraints of the TDL query 400 are optional constraints. If the general constraints are not specified, all hosts will be searched in a default time range.

As shown, lines 3-7 of the TDL query 400 include the tracking declaration. The tracking statement starts with "backward" at line 3 of the TDL query 400. During the execution, the system (e.g., the system 300 of FIG. 3) will automatically explore paths that go through the intermediate points before other paths. Line 3 of the TDL query 400 defines the event that writes to the file "C://Sensitive/important.doc" at "01/16/2017:06:15:14" as the start point of the tracking analysis. Line 4 of the TDL query 400 indicates that paths from the start point to the end point of the tracking analysis should all go through the process with the name as "malware1" or "malware2" and have the ID as 12. Line 5 of the TDL query 400 defines the endpoint of the tracking analysis as the networking communication having the IP address "168.120.11.118". Alternatively, a symbol (e.g., "*") can be defined as the end point if there are no constraints for the end point.

The where statement, which starts with "where" at line 6 of the TDL query 400, indicates that the tracking analysis should exclude the processes having an executable name "explorer", the entire process should be terminated if the execution exceeds 10 minutes, and the diameter of the tracking graph ("hop") should be smaller than 25.

The output specification at line 8 of the TDL query 400 specifies that the generated tracking graph should be stored to the path "./result.dot".

A TDL query, such as the TDL query 400 of FIG. 4, can have multiple versions reflecting the interactive process performed by the system (e.g., system 300 of FIG. 3). For example, the first version of the TDL query 400 that was created, v1, was created without line 4 or line 7. It was determined that the first version was not able to discover interesting or meaningful results within the time limit. However, by obtaining information through interaction with the system, a second version, v2, was created to include line 4 for accelerating the tracking analysis. Similarly, a third version, v3, was created to include line 7 for removing the explorer from the tracking analysis, thereby allowing the suspicious IP to be found within the time limit.

Referring back to FIG. 3, the executor 330 executes the tracking analysis based on the parsed TDL query 310 output by the language parser 320, and generates a tracking graph as a result of the tracking analysis. Generally, the executor 330 operates as follows. First, the executor 330 generates queries (e.g., SQL queries) to retrieve events from the DB 344. The queries can support updating of results progressively. Then, the executor 330 can adopt a prioritization scheme to track the intermediate points, which can be achieved by prioritizing the paths that contain the specified intermediate points. The executor 330 can employ an incremental execution solution to avoid executing the same query twice. The executor 330 can then filter the final results to meet the requirements specified by the TDL query 310, and can utilize adaptive parallelization to accelerate the tracking analysis process.

More specifically, the executor 330 can include a progressive execution component 332 that implements progressive tracking analysis to progressively record the results of the tracking analysis. This can enable viewing of updated results of the tracking analysis without having to wait for the entire tracking analysis to be completed.

The progressive tracking analysis implemented by the progressive execution component 332 can illustratively be achieved by partitioning execution windows. Generally, if a system event depends on many other events ("dependents"), the progressive tracking analysis can split the dependents into multiple execution windows each including a subset of the dependents. The results of the tracking analysis can be updated progressively in the unit of an execution window. The more recent the events, the earlier the results updated to the tracking graph. This execution window based approach can improve the smoothness of the progressive tracking analysis. For example, in real-world environments, system events may not be evenly distributed, and one event can depend on a large number (e.g., millions) of other events.

Formally, an execution window can be defined as a 3-tuple<begin, finish, e>, where begin is the starting time point, finish is the ending time point, and e is the event that needs to be explored. The events can be retrieved from the DB 344 in the unit of an execution window.

Table 1, which provides an exemplary progressive tracking method, is provided as follows:

TABLE 1

| | Input: $e_0$: start point event<br>Output: G: backtracking graph |
|---|---|
| 1 | Initialize priQueue ← genExeWindow($e_0$) and G ← $e_0$; |
| 2 | while priQueue is not empty do |
| 3 |    curr ← priQueue.poll( ); |
| 4 |    G ← addInComingEdges(curr); |
| 5 |    for Event e in curr.getEdges( ) do |
| 6 |       priQueue ← genExeWindow(e); |
| 7 |    end |

TABLE 1-continued

```
8    end
9    return G;
```

As shown in Table 1, instead of adding all the dependents of a current event to the queue, the execution windows that include the dependents of the current event are added in lines 1-6. In the while loop of graph searching (lines 2-6), the progressive tracking method pulls an execution window from the queue and adds all the events in the current execution window to the final tracking graph. The events are used as edges in the tracking graph (line 4). Then, in the for loop (lines 5-7), the progressive tracking method enumerates all the events that occur in the current execution window from the DB 344, obtains their execution windows, and adds these execution window to the queue for future exploration. The function genExeWindow( ) accepts an event, e, as input and returns all the execution windows of the event. To do this, the genExeWindow( ) function can obtain the timestamp of the input event (te). Then, the genExeWindow( ) function can generate an execution window as <ts, te, e>, where ts is a (pre-defined) global starting time. In one embodiment, the execution window is a monolithic execution window. Then, the genExeWindow( ) function can cut the monolithic execution window into k pieces from te to ts. In one embodiment, k is a user configurable parameter. The first execution window is $<ts_1, te, e>$, where $ts_1 = \sigma$ and $$\sigma = \frac{te - ts}{2^k - 1}.$$

If there is more time left in the monolithic execution window, a second execution window, $<ts_2, ts_1, e>$, is generated, wherein $ts_2 = ts_1 - 2\sigma$. This cutting process is repeated until the entire execution window is covered. Accordingly, in each step, the length of the newly generated execution window is twice of the last execution window. An exemplary diagram 500 illustrating the generation of execution windows will now be described with reference to FIG. 5.

Figure 5:
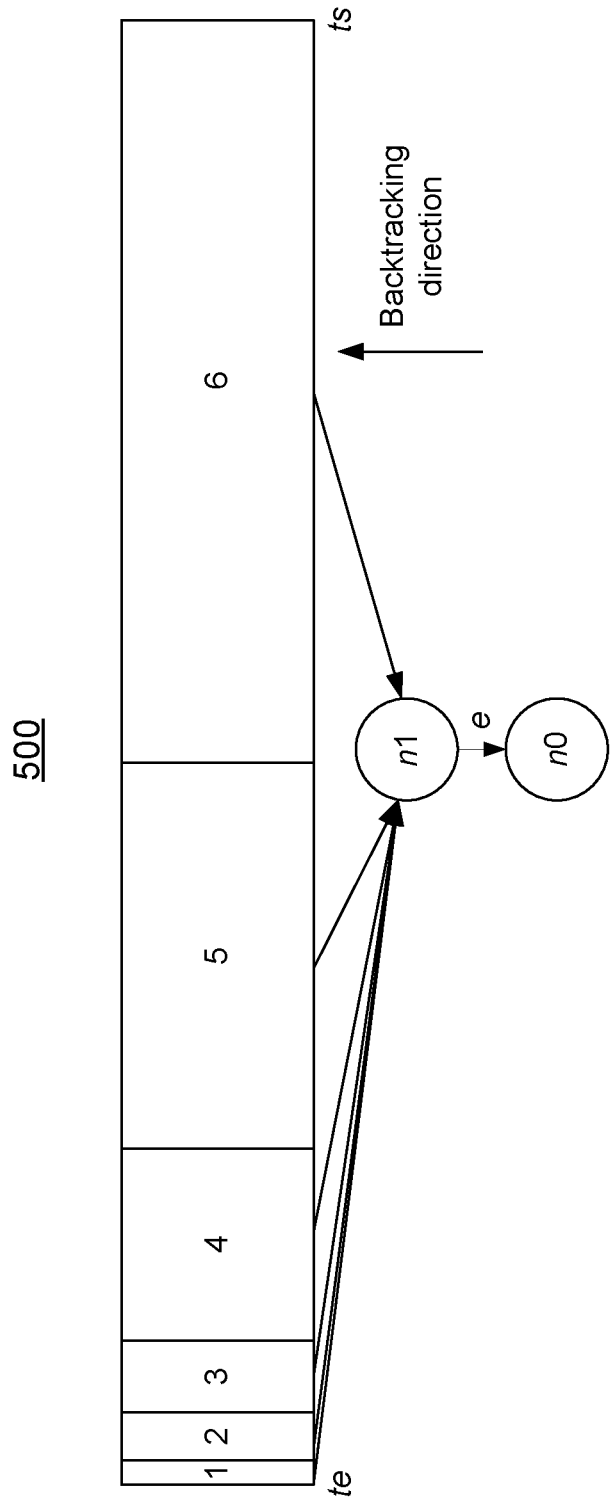
FIG. 5 is a diagram showing an exemplary partitioning of an execution window, in accordance with an embodiment of the present invention.

Referring to FIG. 5, the diagram 500 is shown depicting six execution windows (e.g., k=6). The input event is marked as an edge in the diagram 500. The partition starts from the left to the right in a descending time order. As shown, a pair of two consecutive execution windows, the latter has a window size twice as long as the former.

Referring back to FIG. 3, as shown in Table 1, the generated execution windows are added to a priority queue, priQueue, at line 1 and line 6. The priority queue prioritizes the execution windows based on their end time. For example, since users may care more about recent data, an execution window with a more recent end time can be prioritized in the queue and placed before one with an earlier end time. By prioritizing the execution windows in this fashion, more recent results are more likely to be returned earlier. For similar reasons, smaller execution windows can be allocated to more recent data.

To accelerate the speed of the tracking analysis, the tracking analysis process can be parallelized. For example, as shown, the executor 330 can include an adaptive parallelization component 334 that utilizes an adaptive solution to parallelize the tracking analysis process. In other words, adaptive parallelization component 334 only parallelizes the tracking analysis that is expected to last for a long period of time. Adaptive parallelization can be performed because parallelizing the tracking analysis has computational overhead. In addition, if a tracking analysis finishes within a short period of time, parallelization does not bring substantial benefits. In an enterprise environment, there can be many TDL queries. It is not scalable when applying multiple TDL queries if too many computing resources are spent on short-lasting tracking analyses.

More specifically, when the current tracking analysis is determined to potentially last a long time, the adaptive parallelization component 334 can employ n worker threads that perform the progressive tracking method (e.g., Table 1). To determine whether the current tracking analysis can potentially last a long time, a number of events with a depth of d in the tracking paths can be checked. If the number of events with a depth of d exceeds a threshold T, then it is determined that the current tracking analysis can potentially last a long time. In one embodiment, d=3 and T=10. The n worker threads can share the same priority queue, and can simultaneously fetch exclusive execution windows from the queue, retrieve events from the database 342, update the output and insert newly generated execution windows into the priority queue.

The system 300 should only explore paths that go through the intermediate points sequentially. As mentioned above, in order for the system 300 to know how to proceed through each of the intermediate points sequentially without finishing exploration of all events (e.g., to prune events even with lack of foresight), the executor 330 can leverage a prioritization scheme to track the intermediate points. Generally, when a sub-path of the tracking graph that includes a prefix of the intermediate points is found, the sub-path can be explored before other directions. In one embodiment, a state propagation method can be used to achieve the prioritization scheme. For example, assume that the list of nodes declared in the tracking declaration statement of the TDL query 310 has the format $n_1 \rightarrow n_2 \rightarrow \ldots \rightarrow n_k$. In this list, $n_1$ is the start point, $n_k$ is the end point, and $n_2$ to $n_{k-1}$ are the intermediate points. The executor 330 can assign each node to a corresponding state. During the tracking analysis, if the executor 330 finds that a current node $n_i$ associated with state $s_i$ has a successor that meets the constraints of $n_{i+1}$ (where i+1<k), the executor 330 can assign $n_{i+1}$ to state $s_{i+1}$.

The executor 330 can allow a user to pause execution of the TDL query 310 to allow the user to update the TDL query 310 and resume execution based on the updated TDL query. The executor 330 can automatically update the constraints in the tracking analysis and continue the execution based on the updated TDL query. In this process, an incremental update on the execution is done, and previous execution is not redone from the beginning. Accordingly, the executor 330 uses the new constraints of the updated TDL query to guide prospective exploration.

To support the incremental update, the executor 330 can leverage the following solution. Assuming that at a certain time, the user pauses execution, updates the TDL query, C, to an updated version, C', and then resumes the execution. When the executor 330 receives the updated constraints of C', it determines whether the start point specified C' is the same as the start point specified by C. If not, it means that the user wants to start a new tracking analysis from a different start point, and the executor abandons the current analysis. If the start point is not changed, it means that the user has only added some new conditions. In this case, the executor 330 then recalculates the states for each node by traversing the current explored tracking graph from the start point and redoing the prioritization scheme (e.g., state propagation method) described above. It is noted that, at this time, the tracking graph is already cached in memory, and thus the prioritization scheme can be performed faster than it was before. After the states are recalculated, the executor 330 reorders the nodes in the "frontier" of the tracking analysis, which is the set of the nodes that are detected but not explored, and uses the new conditions to filter nodes in the frontier. After the frontier has been updated, the executor 330 can resume the current execution based on the new constraints.

After the tracking analysis is finished, the executor 330 can clean the final tracking graph to remove all of the nodes that do not meet the constraints of the (updated) TDL query. To do this, the executor 330 can parse all of the nodes and remove the nodes that do not meet the constraints in the where statement of the TDL query, traverse the final tracking graph (e.g., cached in memory) to remove the nodes that are not connected to the start point, and remove the nodes and edges that do not meet the constraints of the intermediate points. For example, a Depth First Search (DFS) can be applied to recursively find all the paths from the start point to the end point and add the paths that meet the constraints of the intermediate points to the final result. Although the number of paths between the start point and the end point can be exponential to the size of the tracking graph, not all of the paths need to be listed. While generating a path, the executor 330 maintains which intermediate points it passes. Therefore, the executor 330 can quickly determine if a path meets the constraints of intermediate points when it reaches an endpoint (e.g., in O(1) time complexity). Accordingly, the executor 330 can clean the final tracking graph with the same time complexity as DFS.

The result viewer 350 provides an interface (e.g., graphical user interface (GUI)) that receives the tracking graph generated by the executor 330 as input and outputs query results 360, which can include a graphical view of the tracking graph. The result viewer 350 can create an optimized version of the tracking graph based on the full version of the tracking graph to aid user insight regarding the tracking analysis. The optimized version of the tracking graph can be created by removing and/or merging some of the nodes in the full version of the tracking graph. Note that the result viewer 350 does not delete any node from the tracking graph, but rather hides some of the nodes from the user. Hence, a user can switch between the full version of the tracking graph and the optimized version of the tracking graph in the result viewer 350. Multiple types of optimization can be incorporated in the result viewer 350. For example, as shown, the result viewer can include a pruning component 352 and a summarization component 354.

The pruning component 352 prunes results output by the executor 330 to eliminate "dead end" nodes that do not propagate data flows to other nodes. In one embodiment, the pruning component 352 employs one or more filters to prune the tracking graph. For example, the one or more filters can include a read-only filter that eliminates files that have been read but not written within the time period being analyzed. Oftentimes, these files are default configuration or common libraries which are generally unrelated to security attacks. As another example, the one or more filters can include a self-read-only filter that prunes files that have been read and written only by one process. Such files are usually logs and are generally unrelated to security attacks.

The summarization component 354 summarizes the pruned results to make the results more concise. For example, the summarization component 354 can merge nodes in the tracking graph. Approaches that can be used to merge the nodes in the tracking graph include: (1) merge similar nodes; (2) merge transient processes; and (3) merge sockets connected to the same remote IP.

In the merge similar nodes approach, nodes A and B are similar if the following four statements are true: (1) A and B have only one predecessor and one successor, respectively; (2) the parents of A and B are the same; (3) the children of A and B are the same; and (4) A and B represent the same type of system objects. These similar nodes are normally generated as a batch and have similar meanings in the tracking graph. The summarization component 354 can merge the similar nodes as one node in the optimized version of the tracking graph.

In the merge transient processes approach, a node in the tracking graph is defined as a transient process node if it meets the following three conditions: (1) the node represents a process; (2) the node has only one predecessor and one successor and both of the predecessor and the successor are processes; and (3) the executable name of the node is the same as the executable name of its predecessor. A transient process is merged to its parent.

When accessing a remote host, a local host can generate different sockets to connect to the same process with the same remote IP address and port. In the merge sockets connected to the same remote IP approach, all adjacent socket nodes with the same incoming/outgoing edge can be merged into a single virtual socket node.

Referring back to the motivating example of FIG. 2, to reconstruct the attack scenario of this attack case, an illustrative team of security experts had begun backtracking from the event of executing the "dropper.exe" (e.g., after being alerted by an anomaly detector), although the team has no idea about the root cause of the alert. Thus, without any guidance at the moment, the team could only run a basic backtracking analysis. To do so, the team executed the following TDL query for basic backtracking as an initial TDL query:

$_1$from "01/02/2017" to "02/01/2017"
$_2$backward proc alert[exename = "dropper.exe"
    and event_time = "01/17/2017:03:01:07"
    and type="start"] –> *
$_3$output = "./result.dot"

The initial TDL query declared that the backtracking starts from the event of starting a process named "dropper.exe" at the given time, and that the tracking analysis searches the data dependencies of the start point within one month, which is given by the "from to" statement at line 1. The initial TDL query also provides an output specification at line 3 to store the tracking graph in the "result.dot" file. However, no other constraints were provided within the initial TDL query.

Once the initial TDL query was executed, the tracking graph began to be displayed progressively. After viewing two events in less than one minute, the team noticed that the tracking graph included "excel.exe", which happened to load a lot of .dll files. At this time, the team paused the tracking analysis, searched other alerts from the anomaly detector, and found that there were no suspicious modifications to the .dll files. Hence, the team concluded that the attack was not from the injected code in the .dll files and that focus of the tracking analysis should be placed on other data dependencies. Thus, the team modified the initial TDL query to exclude all .dll files by including a where statement as follows:

```
₁from "01/02/2017" to "02/01/2017"
₂backward proc alert[exename = "dropper.exe"
    and event_time = "01/17/2017:03:01:07"
    and type="start"] –> *
₃where file.path != "*.dll"
₄output = "./result.dot"
```

After this modification, the team resumed the execution of the tracking analysis with the updated TDL query. After viewing eight more events in two minutes, the team noticed that the tracking graph had reached "findstr.exe" through "findstr.out". After looking at the first 100 events after "findstr.exe", the team realized that "findstr.exe" may be used to scan a lot of files, and that it may take a long time to fully explore the dependency graph after "findstr.exe". The team further realized that "findstr.exe" was more likely to be used by "dropper.exe" rather than be the root cause of it. So, the security team paused the tracking analysis again and modified the updated TDL query to exclude "findstr.exe" from the graph by modifying the where statement as follows:

```
₁from "01/02/2017" to "02/01/2017"
₂backward proc alert[exename = "dropper.exe"
    and event_time = "01/17/2017:03:01:07"
    and type="start"] –> *
₃where file.path != "*.dll" and proc.exename
    != "findstr.exe"
₄output = "./result.dot"
```

After this modification, the team resumed the execution of the tracking analysis with the newly updated TDL query. After about four minutes, the team found "outlook.exe" and the sockets connected to it by checking about 30 more events. At this moment, the team found that "dropper.exe" was created by "excel.exe", which was spawned by "outlook.exe". Thus, they confirmed that the root cause of "dropper.exe" was a phishing e-mail. Until this point, the team had spent about seven minutes performing the tracking analysis, checking about 140 events in total. Accordingly, the inter-application dependency analysis process performed in accordance with the embodiments described herein improves threat detection in a computer system by, e.g., reducing the amount of time for discovering the root cause of a security threat or attack.

FIG. 6 is a flow diagram showing an exemplary method 600 for inter-application dependency analysis, in accordance with an embodiment of the present invention.

At block 610, a TDL query for performing a tracking analysis is received. As described above, TDL is a domain specific language that can allow users to specify conditions and constraints in the tracking analysis in a concise way. The TDL query 310 can specify constraints including, e.g., time range, host range, start point of backtracking, the end conditions of backtracking, and which path to explore. During the execution of a TDL query, a progressively updated backtracking graph can be output. The TDL query can be viewed as including three parts: (1) general constraints for performing the tracking analysis; (2) a tracking declaration specifying at least events of the computer system to be analyzed; and (3) an output specification specifying a location for storing a tracking graph generated by the tracking analysis. Further details regarding the TDL query are described above with reference to FIGS. 3 and 4.

At block 620, the TDL query is parsed using a language parser. Further details regarding parsing the TDL query are described above with reference to FIG. 3.

At block 630, the tracking analysis is executed based on the parsed TDL query by implementing a progressive tracking method to generate a result of the tracking analysis. For example, one or more queries can be executed to retrieve one or more events from a database, and the progressive tracking method can progressively record the results of the tracking analysis to enable viewing of updated results of the tracking analysis without having to wait for the entire tracking analysis to be completed. In one embodiment, to accelerate the speed of the tracking analysis (e.g., when the current tracking analysis is determined to potentially last a long time), the tracking analysis can be adaptively parallelized by employing a plurality of worker threads to perform the progressive tracking method. Execution of the tracking analysis can be paused to allow for update of the TDL query, and can be resumed based on the updated TDL query. For example, the constraints in the tracking analysis can be automatically updated based on the updated TDL query, and the update can be an incremental update such that the previous execution is not redone from the beginning. Further details regarding block 630 are described above with reference to FIG. 3.

At block 640, a tracking graph is generated by cleaning the result of the tracking analysis. For example, the tracking graph can be cleaned by removing all of the nodes that do not meet the constraints of the (updated) TDL query.

At block 650, query results based on the tracking graph are output via an interface. In one embodiment, the interface includes a GUI. An optimized version of the tracking graph can be created based on the full version of the tracking graph, such as by removing and/or merging some of the nodes in the full version of the tracking graph. For example, the results output by the tracking analysis at block 630 can be pruned to eliminate "dead end" nodes by employing one or more filters (e.g., read-only filter and/or a self-read-only filter), and the pruned results can be summarized to make the query results more concise. Further details regarding block 640 are described above with reference to FIG. 3.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for improving threat detection in a computer system by performing an inter-application dependency analysis on events of the computer system, comprising:
    a memory device for storing program code;
    a processor operatively coupled to the memory device and configured to perform the inter-application dependency analysis by executing program code stored on the memory device to:
        receive a Tracking Description Language (TDL) query for performing a tracking analysis, the TDL query including general constraints for performing the tracking analysis, a tracking declaration specifying at least events of the computer system to be analyzed, and an output specification specifying a location for storing a tracking graph generated by the tracking analysis;
        parse the TDL query using a language parser;
        execute the tracking analysis based on the parsed TDL query by implementing a progressive tracking method to generate a result of the tracking analysis by:
            splitting dependents of a given one of the events of the computer system into a plurality of execution windows with each of the execution windows being defined as a 3-tuple<begin, finish, e>, where begin is a starting time point, finish is an ending time point, and e is an event of interest, wherein the events of the computer system are used as edges in the tracking graph;
            enumerating all events occurring in each of the execution windows; and
            prioritizing the plurality of execution windows based on their respective ending time points;
        generate a tracking graph by cleaning the result of the tracking analysis by removing all nodes that fail to meet constraints of the TDL query; and
        output, via an interface, query results based on the tracking graph, the query results including at least one of the tracking graph and an optimized version of the tracking graph.

2. The system of claim 1, further comprising program code stored on the memory device to:
    pause the execution of the tracking analysis;
    receive an updated TDL query; and
    resume the execution of the tracking analysis based on the updated TDL query.

3. The system of claim 1, further comprising program code stored on the memory device to execute the tracking analysis by adaptively parallelizing the progressive tracking method using a plurality of worker threads.

4. The system of claim 3, wherein the progressive tracking method is adaptively parallelized in response to a determination that a number of events with a given depth exceeds a threshold.

5. The system of claim 1, further comprising program stored on the memory device to generate the optimized version of the tracking graph by pruning the tracking graph to generate pruned results using one or more filters, and summarizing the pruned results.

6. The system of claim 5, wherein the pruned results are summarized by merging nodes from the pruned results.

7. A computer program product comprising a non-transitory computer readable storage medium having program instructions embodied therewith, the program instructions executable by a computer to cause the computer to perform a method for improving threat detection in a computer system by performing an inter-application dependency analysis on events of the computer system, the method comprising:
    receiving a Tracking Description Language (TDL) query for performing a tracking analysis, the TDL query including general constraints for performing the tracking analysis, a tracking declaration specifying at least events of the computer system to be analyzed, and an output specification specifying a location for storing a tracking graph generated by the tracking analysis;
    parsing the TDL query using a language parser;
    executing the tracking analysis based on the parsed TDL query, including implementing a progressive tracking method to generate a result of the tracking analysis by:
        splitting dependents of a given one of the events of the computer system into a plurality of execution windows with each of the execution windows being defined as a 3-tuple<begin, finish, e>, where begin is a starting time point, finish is an ending time point, and e is an event of interest, wherein the events of the computer system are used as edges in the tracking graph;
        enumerating all events occurring in each of the execution windows; and
        prioritizing the plurality of execution windows based on their respective ending time points;
    generating a tracking graph by cleaning the result of the tracking analysis, including removing all nodes that fail to meet constraints of the TDL query; and
    outputting, via an interface, query results based on the tracking graph, the query results including at least one of the tracking graph and an optimized version of the tracking graph.

8. A computer-implemented method for improving threat detection in a computer system by performing an inter-application dependency analysis on events of the computer system, comprising:
    receiving, by a processor operatively coupled to a memory, a Tracking Description Language (TDL) query for performing a tracking analysis, the TDL query including general constraints for performing the tracking analysis, a tracking declaration specifying at least events of the computer system to be analyzed, and an output specification specifying a location for storing a tracking graph generated by the tracking analysis;

parsing, by the processor, the TDL query using a language parser;

executing, by the processor, the tracking analysis based on the parsed TDL query, including implementing a progressive tracking method to generate a result of the tracking analysis by:

splitting dependents of a given one of the events of the computer system into a plurality of execution windows with each of the execution windows being defined as a 3-tuple<begin, finish, e), where begin is a starting time point, finish is an ending time point, and e is an event of interest, wherein the events of the computer system are used as edges in the tracking graph;

enumerating all events occurring in each of the execution windows; and prioritizing the plurality of execution windows based on their respective ending time points;

generating, by the processor, a tracking graph by cleaning the result of the tracking analysis, including removing all nodes that fail to meet constraints of the TDL query; and outputting, by the processor and via an interface, query results based on the tracking graph, the query results including at least one of the tracking graph and an optimized version of the tracking graph.

9. The computer-implemented method of claim 8, further comprising:

pausing, by the processor, the execution of the tracking analysis;

receiving, by the processor, an updated TDL query; and resuming, by the processor, the execution of the tracking analysis based on the updated TDL query.

10. The computer-implemented method of claim 8, wherein executing the tracking analysis further includes adaptively parallelizing the progressive tracking method using a plurality of worker threads.

11. The computer-implemented method of claim 10, wherein the progressive tracking method is adaptively parallelized in response to determining that a number of events with a given depth exceeds a threshold.

12. The computer-implemented method of claim 8, further comprising generating the optimized version of the tracking graph.

13. The computer-implemented method of claim 12, wherein generating the optimized version of the tracking graph further comprises pruning the tracking graph to generate pruned results using one or more filters.

14. The computer-implemented method of claim 13, wherein generating the optimized version of the tracking graph further comprises summarizing the pruned results.

* * * * *